(12) United States Patent
Elshaer et al.

(10) Patent No.: US 10,112,495 B2
(45) Date of Patent: Oct. 30, 2018

(54) VEHICLE WIRELESS CHARGING SYSTEM INCLUDING AN INVERTER TO CONTROL A VOLTAGE INPUT TO A VEHICLE POWER CONVERTER

(71) Applicant: FORD GLOBAL TECHNOLOGIES, LLC, Dearborn, MI (US)

(72) Inventors: Mohamed Elshaer, Canton, MI (US); Hadi Malek, Dearborn, MI (US); Richard William Kautz, North Branch, MI (US); Nevin Altunyurt, Ann Arbor, MI (US); Christopher W. Bell, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 14/810,098

(22) Filed: Jul. 27, 2015

(65) Prior Publication Data

US 2017/0028853 A1 Feb. 2, 2017

(51) Int. Cl.
*B60L 11/18* (2006.01)
*H02M 3/337* (2006.01)
*H02M 1/00* (2006.01)

(52) U.S. Cl.
CPC ......... *B60L 11/182* (2013.01); *B60L 11/1838* (2013.01); *B60L 11/1844* (2013.01); *H02M 3/3376* (2013.01); *H02M 2001/007* (2013.01); *H02M 2001/0058* (2013.01); *Y02T 10/7005* (2013.01); *Y02T 10/7241* (2013.01); *Y02T 10/92* (2013.01); *Y02T 90/14* (2013.01)

(58) Field of Classification Search
CPC .......... H02J 5/005; H02J 7/025; H02J 7/0027; B60L 11/1838; B60L 2230/34; B60L 2230/00; Y02T 90/125; Y02T 90/163; G05F 1/13–1/14; G05F 1/16; G05F 1/24; G05F 1/32; H01F 27/40; H01F 2027/408
See application file for complete search history.

(56) References Cited

U.S. PATENT DOCUMENTS 7,521,890 B2 4/2009 Lee et al.
8,338,991 B2 12/2012 Von Novak et al.
(Continued)

OTHER PUBLICATIONS

Zhao et al., WPTC 2015, Optimal Operation Point Tracking Control for Inductive Power Transfer System, IEEE WPTC, May 15, 2015, Boulder, CO, 13 pages.
(Continued)

*Primary Examiner* — Nguyen Tran
*Assistant Examiner* — Monica Mata
(74) *Attorney, Agent, or Firm* — David Kelley; Brooks Kushman P.C.

(57) ABSTRACT

A wireless vehicle charging system includes at least one controller configured to operate an inverter to control a voltage input to a power converter in a vehicle to drive an impedance phase angle at an output of the inverter toward a predetermined angle and achieve a power demand at an output of the vehicle power converter. The at least one controller is further configured to operate the vehicle power converter to achieve the power demand. The at least one controller may control a frequency output of the inverter to adjust the voltage input to the power converter based on a rate of change of an objective function that is configured to reduce an output power error of the power converter and an impedance phase angle error at the output of the inverter.

18 Claims, 4 Drawing Sheets

(56) References Cited

U.S. PATENT DOCUMENTS

| | | |
|---|---|---|
| 8,665,049 B2 | 3/2014 | Miller |
| 8,704,534 B2 | 4/2014 | Kim et al. |
| 8,872,472 B2 | 10/2014 | Baarman et al. |
| 2013/0033118 A1 | 2/2013 | Karalis et al. |
| 2013/0093254 A1 | 4/2013 | Urano |
| 2014/0265614 A1 | 9/2014 | Kim et al. |
| 2015/0035377 A1 | 2/2015 | James et al. |
| 2015/0042173 A1 | 2/2015 | Lee et al. |
| 2015/0051750 A1 | 2/2015 | Kurs et al. |

OTHER PUBLICATIONS

Zhao et al., Optimal Operation Point Tracking Control for Inductive Power Transfer System, Wireless Power Transfer Conference (WPTC), 2015 IEEE, May 13-15, 2015, Boulder, CO, 4 pages.

VEHICLE WIRELESS CHARGING SYSTEM INCLUDING AN INVERTER TO CONTROL A VOLTAGE INPUT TO A VEHICLE POWER CONVERTER

TECHNICAL FIELD

This application generally relates to controlling a vehicle wireless charging system.

BACKGROUND

Plug-in hybrid-electric vehicles (PHEV) and battery electric vehicles (BEV) include a traction battery for powering the vehicle. The vehicle can be coupled to an external power source to charge the traction battery. The vehicle may support wireless charging of the traction battery. Wireless charging is accomplished by the use of coils in the charging system and the vehicle. Power is inductively transferred from the charging system to the vehicle through the coils. Alignment of the charging coils may be accomplished by a variety of methods. Some systems may rely on the driver to align the charging coils. For example, the charging system may include a coil in the floor of a charge station. The vehicle may include a coil on an underside of the vehicle that may be in proximity to the floor coil when the vehicle is positioned in the charge station. Effectiveness of the charging may depend on the relative alignment of the coils.

SUMMARY

A vehicle wireless charging system includes an inverter. The system further includes at least one controller programmed to operate the inverter to control a voltage input to a vehicle power converter to drive an impedance phase angle at an output of the inverter toward a predetermined angle and achieve a power demand at an output of the vehicle power converter, and operate the vehicle power converter to achieve the power demand.

The predetermined angle may be configured to achieve zero voltage switching of the inverter. The impedance phase angle may be a phase angle difference between a voltage at the output of the inverter and a current at the output of the inverter.

The at least one controller may be further programmed to operate the inverter by adjusting a frequency of a voltage at the output of the inverter based on a voltage reference. The voltage reference may be based on the power demand, a power output of the vehicle power converter, the impedance phase angle, and the predetermined angle. The voltage reference may be based on (i) a rate of change of a weighted sum of a first term using an output power error and a second term using an impedance phase angle error, and (ii) a rate of change of the voltage reference.

The at least one controller may be further programmed to operate the vehicle power converter by adjusting a duty cycle for a switching device for coupling the voltage input to a load based on a current input reference and the current input to the vehicle power converter. The current input reference may be derived from a voltage reference that is based on (i) a rate of change of a weighted sum of a first term using an output power error and a second term using an impedance phase angle error, and (ii) a rate of change of the voltage reference.

A vehicle wireless charging system includes an inverter configured to inductively couple to a vehicle power converter. The system further includes at least one controller programmed to control a frequency output of the inverter to adjust a voltage input to the vehicle power converter based on a rate of change of an objective function configured to reduce an output power error of the vehicle power converter and an impedance phase angle error at an inverter output.

The at least one controller may be further programmed to control the frequency output based on a rate of change of the voltage input. The at least one controller may be further programmed to change a duty cycle for switching the vehicle power converter based on a power demand of a load coupled to the vehicle power converter. The output power error may be a difference between a power demand at a vehicle power converter output and a power output at the vehicle power converter output, and the impedance phase angle error may be a difference between a reference impedance phase angle and a measured impedance phase angle at the inverter output. The objective function may be a weighted objective function such that a first weighting value associated with the output power error is greater than a second weighting value associated with the impedance phase angle error.

A method of controlling vehicle charging includes changing, by at least one controller, a frequency at an output of an inverter that is configured to generate a voltage input to an inductively coupled power converter based on a rate of change of a weighted objective function that includes an output power error of the power converter and an impedance phase angle error at the output of the inverter.

The method may further include changing, by the at least one controller, a duty cycle for switching the power converter based on a current reference for an input current to the power converter derived from the voltage input and a power demand of a load coupled to the power converter.

The method may further include changing, by the at least one controller, the duty cycle to reduce an error between the current reference and a current input to the power converter.

The method may further include changing, by the at least one controller, the frequency to reduce an error between the voltage input and a voltage reference that is based on a rate of change of the weighted objective function. The method may further include changing, by the at least one controller, the frequency based on a rate of change of the voltage reference.

The method may further include incrementing, by the at least one controller, the voltage reference by a predetermined amount in response to a sign of the rate of change of the weighted objective function being different than a sign of the rate of change of the voltage reference. The method may further include decrementing, by the at least one controller, the voltage reference by a predetermined amount in response to a sign of the rate of change of the weighted objective function being identical to a sign of the rate of change of the voltage reference.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
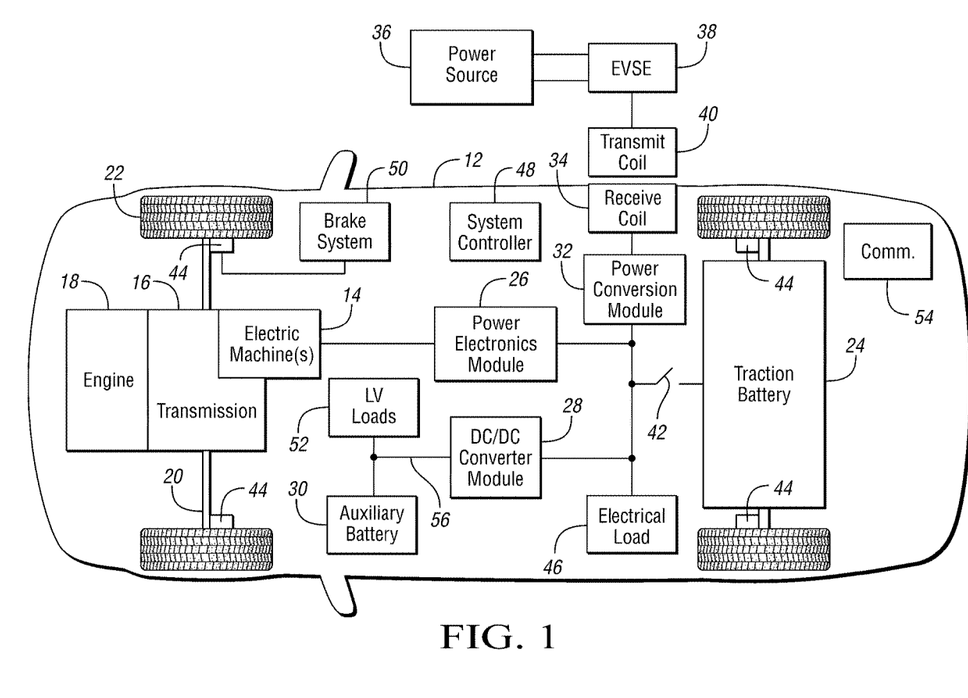
FIG. 1 is an example of an electrified vehicle.

FIG. 1 depicts an electrified vehicle 12 that is typically referred to as a plug-in hybrid-electric vehicle (PHEV). A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. An electrified vehicle 12 may include a battery electric vehicle (BEV). The BEV may not include the engine 18.

A traction battery or battery pack 24 stores energy that can be used by the electric machines 14. A vehicle battery pack 24 typically provides a high voltage DC output. The traction battery 24 is electrically coupled to one or more power electronics modules. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a traction battery 24 may provide a DC voltage while the electric machines 14 may operate with a three-phase AC current to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads 52. An output of the DC/DC converter module 28 may be electrically coupled to an auxiliary battery 30 (e.g., 12V battery). The low-voltage systems 52 may be electrically coupled to the auxiliary battery 30. One or more electrical loads 46 may be coupled to a high-voltage bus that is coupled to the traction battery 24. The electrical loads 46 may have an associated controller that operates and controls the electrical loads 46 when appropriate. Examples of electrical loads 46 may be a fan, a heating element and/or an air-conditioning compressor.

The electrified vehicle 12 may be configured to recharge the traction battery 24 from an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38.

The EVSE 38 may have one or more transmit coils 40 that are configured to be placed in proximity to one or more receive coils 34 of the vehicle 12. In some configurations, the receive coil 34 may be within a charge port configured to receive the transmit coil 40. In some configurations, the receive coil 34 may be located on an underside of the vehicle 12. In some configurations, the receive coil 34 may be located near an outer surface of the vehicle 12. The receive coil 34 may be integrated into a charge port that is configured to receive the transmit coil 40 and align the transmit coil 40 with the receive coil 34. The receive coil 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12.

The transmit coil 40 may be configured in a stationary position. For example, the transmit coil 40 may be located on a surface of a charging station. When the vehicle 12 is parked in the charging station, the transmit coil 40 may come into proximity of the receive coil 34. In some configurations, the transmit coil 40 and/or the receive coil 34 may be moveable to aid in aligning the coils.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

The vehicle 12 may include a wireless communications module 54 to communicate with devices and systems remote from the vehicle 12. The wireless communications module 54 may include an onboard modem having an antenna to communicate with off-board devices or systems. The wireless communications module 54 may be a cellular communications device to enable communications via a cellular data network. The wireless communications module 54 may be a wireless local area network (LAN) device compatible with IEEE 802.11 family of standards (i.e., WiFi) or a WiMax network. The wireless communications module 54 may include a vehicle based wireless router to allow connection to remote networks in range of a local router. The wireless communications module 54 may interface with one or more controllers in the vehicle 12 to provide data.

Figure 2:
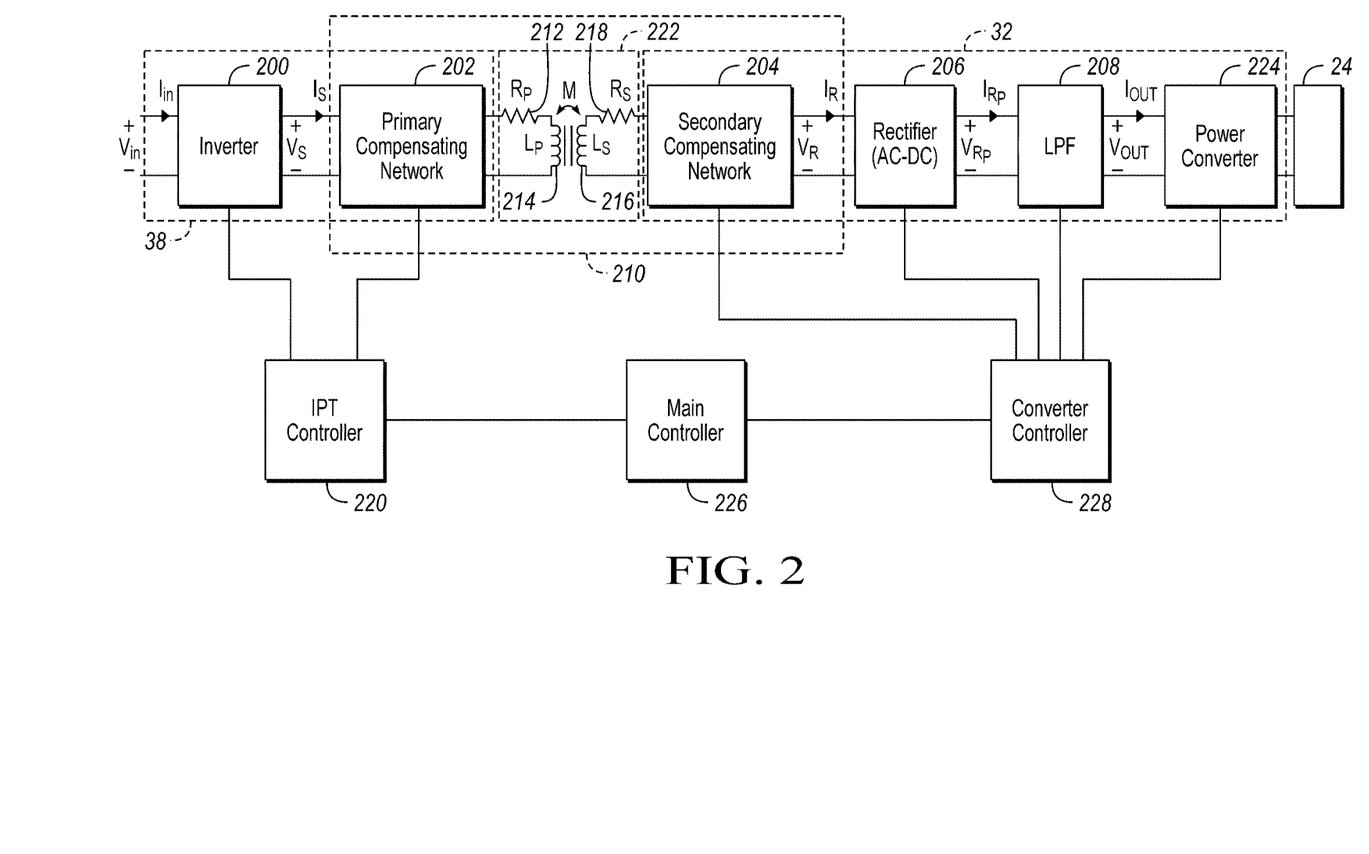
FIG. 2 is a diagram of a possible vehicle charging system.

FIG. 2 depicts a possible configuration for an inductive power transfer (IPT) system that may utilize the one or more transmit coils 40 and the one or more receive coils 34 to transfer energy to the vehicle 12. Operation of the wireless charging system may be initiated when the transmit coil 40 and the receive coil 34 are in proximity with one another. In some configurations, the operator of the vehicle 12 may position the transmit coil 40 into the charge port that is configured to align the transmit coil 40 with the receive coil 34. In some configurations, the transmit coil 40 may be located in a fixed location of a charging station. The receive coil 34 may be positioned by moving the vehicle 12 within the charging station. In this configuration, the alignment of the transmit coil 40 relative to the receive coil 34 may vary. In some configurations, the receive coil 34 may be mounted on an underside of the vehicle 12. The transmit coil 40 may be located in a floor of a charging station. A coil alignment system may be implemented to detect and adjust the alignment of the receive coil 34 relative to the transmit coil 40. Charging may be initiated when the coils are acceptably aligned.

The IPT system may be used for automotive applications to provide non-contact charging of the traction battery 24. The IPT system avoids having to physically connect conductive elements between the charging station and the vehicle. Using a non-contact system avoids conductive element wear issues caused by repeated connection and disconnection of the electrical contacts. The vehicle wireless charging system may include an inverter configured to supply voltage to a resonant tank circuit. The resonant tank circuit may be comprised of elements that are on-board and off-board the vehicle. The off-board portion of the resonant tank circuit may include a primary compensation network and the transmit coil 40. The on-board portion of the resonant tank circuit may include the receive coil 34 and a secondary compensation network.

The loosely coupled transmit coil 40 and receive coil 34 may be modeled as a transformer 222 with a particular set of parameters. The transmit coil 40 may be modeled as a primary-side of the transformer that includes a primary resistance, $R_p$ 212, coupled in series with a primary inductance, $L_p$ 214. The receive coil 34 may be modeled as a secondary-side of the transformer that includes a secondary inductance, $L_s$ 216, coupled in series with a secondary resistance, $R_s$ 218. The inductive coupling between the primary-side and the secondary-side may be modeled by a mutual inductance, M, that represents the coupling between the transmit coil 40 and the receive coil 34. The mutual inductance, M, may affect the voltage and current induced in the receive coil 34 in response to current flowing in the transmit coil 40. A coupling coefficient, k, may be defined based on the mutual inductance, the primary inductance, and the secondary inductance. Different alignments of the transmit coil 40 and the receive coil 34 may cause differences in the values of the transformer model parameters.

The transformer model 222 may be further integrated and modeled as a resonant tank network 210. A primary compensating network 202 may be coupled to the transmit coil 40. A secondary compensating network 204 may be coupled to the receive coil 34. The model of the resonant tank network 210 may include the primary compensating network 202, the transformer 222, and the secondary compensating network 204. The primary compensating network 202 may include a selectable impedance that may be coupled to the primary side. In some configurations, the primary compensating network 202 may comprise a bank of selectable capacitances that are coupled in series with the transmit coil 40. The secondary compensating network 204 may include a selectable impedance that may be coupled to the receive coil 34. In some configurations, the secondary compensating network 204 may comprise a bank of selectable capacitances that are coupled in series with the receive coil 34. The capacitance values may be chosen such that the circuit resonates with the self-inductance of the coils 34, 40 to achieve a unity power factor at a tuned frequency, $f_0$. The resonant tank network 210 may be configured to achieve soft switching for the inverter switching elements and to provide voltage gain controllability via an impedance gain. The resonant tank network 210 may create a resonant magnetic coupling to increase the power transfer efficiency under conditions including a large air gap and coil misalignment.

The IPT system may include an inverter 200 configured to convert a direct current (DC) voltage to an alternating current (AC) voltage. The inverter 200 may be coupled to the transmit coil 40 via the primary compensating network 202. The AC voltage may be input to the resonant tank network 210 to transfer energy to the vehicle 12. Input terminals of the inverter 200 may be coupled to a power source that provides a DC input voltage, $V_{in}$, and a DC current, $I_{in}$. Output terminals of the inverter 200 may be coupled to the primary compensating network 202 to provide an AC output voltage, $V_s$, and an AC current, $I_s$. The inverter 200 may be a full-bridge inverter that includes switching elements coupled between each of the input terminals and output terminals of the inverter 200.

An AC voltage and current may be induced in the secondary side of the transformer 222. The IPT system may further include a rectifier 206 and a low-pass filter 208 configured to convert an AC voltage into a DC voltage. The rectifier 206 may be coupled to the receive coil 34 via the secondary compensating network 204. Output terminals of the rectifier 206 may be coupled to the low-pass filter 208 to smooth the rectified voltage. Output of the low-pass filter 208 may be coupled to a vehicle power converter 224.

The inverter 200 and the primary compensating network 202 may be included as part of the EVSE 38. The secondary compensating network 204, rectifier 206, low-pass filter 208, and the vehicle power converter 224 may be included as part of the power conversion module 32 in the vehicle 12. Other component arrangements are possible.

Efficiency of the IPT system may change with variations in a vehicle load and alignment of the coils. The IPT system may operate at peak efficiency when the transmit coil 40 and the receive coil 34 are aligned for a maximum coupling coefficient and the circuit is operated at an optimal voltage level. Existing IPT systems operate using a fixed input voltage and a fixed output voltage which limits the simultaneous achievement of optimal efficiency and operation at low Volt-Ampere (VA) ratings of the power supply for a given coupling coefficient. The VA rating reflects the apparent power in an AC circuit. The apparent power includes power that is cycled in the circuit by the reactive components (e.g., inductors and capacitors). The VA rating may impact conductor sizing in the system. In general, it is desirable to minimize the VA rating such that it approaches the actual power rating (in Watts) of the system. This relates to a power factor of the system whereby a value approaching unity is generally desired.

Figure 3:
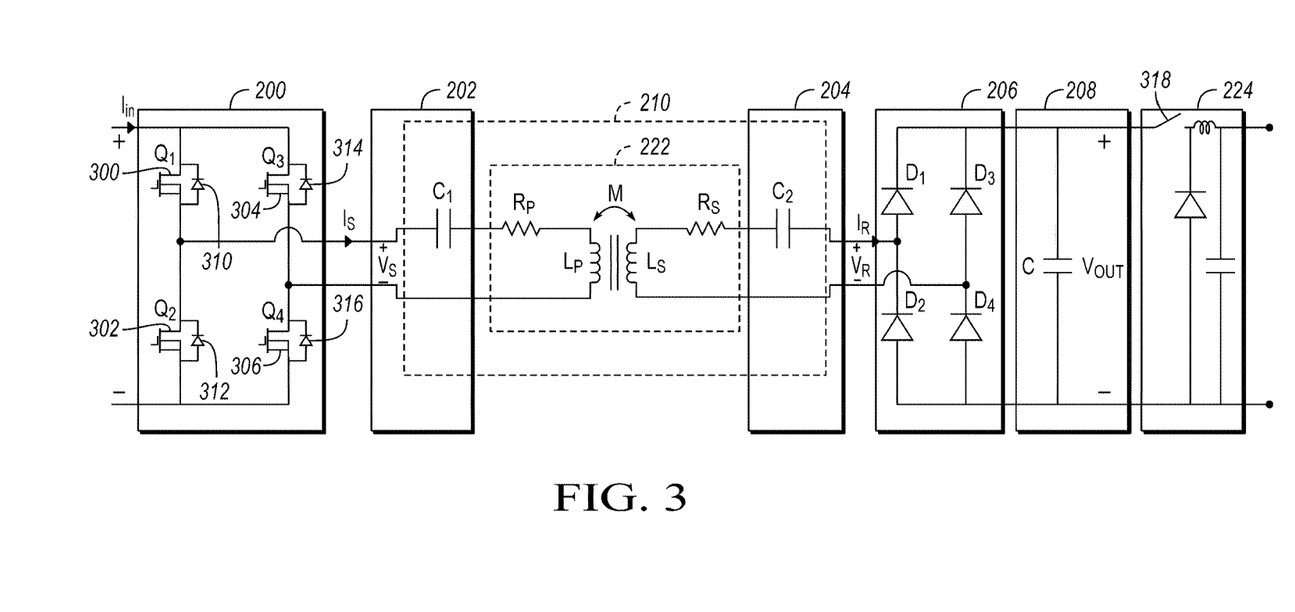
FIG. 3 is a diagram of a possible configuration of components of a vehicle charging system.

FIG. 3 depicts an example configuration of some components of the IPT system. The inverter 200 may include a plurality of solid-state switching devices coupled between each of the input and output terminals of the inverter 200. In the full-bridge configuration, four solid-state switching devices $Q_1$ 300, $Q_2$ 302, $Q_3$ 304, and $Q_4$ 306 may be used. Each of the solid-state switching devices 300, 302, 304, 306 may have an associated diode 310, 312, 314, 316 connected in parallel. Control inputs for each of the solid-state switching devices 300, 302, 304, 306 may be coupled to an IPT controller 220. The IPT controller 220 may control the cycling of the solid-state switching devices 300, 302, 304, 306. The solid-state switching devices 300, 302, 304, 306 may be metal-oxide semiconductor field-effect transistors (MOSFET).

The solid-state switching devices 300, 302, 304, 306 may be controlled to cause a square wave output voltage with adjustable frequency at the inverter output terminals. The square-wave voltage may be input to the resonant tank network 210. The inverter output current may be a sinusoidal waveform that is phase shifted from the fundamental component of the inverter output voltage by a phase angle, $\phi_s$. The phase angle depends on the impedance of the resonant tank network 210 and an impedance of a load.

For example, when switching device Q1 300 and Q4 306 are activated, the DC input voltage, $V_{in}$, is applied across the output terminals of the inverter 200. Current may flow from the input voltage source through Q1 300, the primary compensating network 202 and the transmit coil 40 and return through Q4 306.

The inverter 200 may generate a square voltage output for the resonant tank network 210 at a frequency that is based on the switching of the solid-state switching devices 300, 302, 304, 306. Depending on the impedance of the resonant tank network 210, the switching of the solid-state switching devices 300, 302, 304, 306 may be classified as zero voltage switching (ZVS) or zero current switching (ZCS). Zero voltage switching of a switching device is achieved when off to on transitions occur when the voltage across the switching device is zero. Zero voltage switching helps to improve efficiency by minimizing switching losses. Zero voltage switching can be achieved when the impedance of the resonant tank network 210 is inductive with a phase angle greater than zero. The phase angle of the impedance represents the difference in phase angle between the voltage across the network and the current flowing through the network. When the impedance is inductive, the voltage across the network leads the current flowing through the network. Zero current switching is achieved when on to off transitions occur when the current through the switch is zero. Zero current switching can be achieved when the resonant tank network impedance is capacitive with a phase angle less than zero. In this case, the voltage lags the current.

When the solid-state switching devices 300, 302, 304, 306 are MOSFETs, it is desirable to achieve zero voltage switching to reduce switching losses. The IPT controller 220 may command pairs of switching devices in a particular sequence. During part of the cycle, only switching devices $Q_1$ 300 and $Q_4$ 306 may be switched on. During the remaining part of the cycle, only switching devices $Q_2$ 302 and $Q_3$ 304 may be switched on. During the time when $Q_1$ 300 and $Q_4$ 306 are switched on, the input voltage is applied to the output terminals. This may cause a current to flow to the resonant tank network 210. Assuming a positive impedance phase angle, the voltage output leads the current. At some time, switching devices $Q_1$ 300 and $Q_4$ 306 will be switched off. At this time, no current can flow through $Q_1$ 300 and $Q_4$ 306. However, any current that is flowing in the circuit finds a path through the diodes 312, 314 that are associated with $Q_2$ 302 and $Q_3$ 304. As current flows through the diodes 312, 314, the voltage across the diodes 312, 314 and the associated switching elements will be the forward voltage drop of the diode which is typically a small voltage. The switching elements $Q_2$ 302 and $Q_3$ 304 may be switched on in the presence of this near zero voltage. A similar analysis may be constructed for turning on switching elements $Q_1$ 300 and $Q_4$ 306.

The resonant tank network 210 is formed by the combinations of the circuit elements that include the compensating networks 202, 204 and the transformer model 222. The input impedance of the resonant tank network 210 may be represented by:

$$Z_{in} = R_p - \frac{j}{\omega C_p} + \omega L_p j + \frac{\omega^2 M^2}{R_e + R_s - j/\omega C_s + \omega L_s j} \quad (1)$$

where $R_e$ is an output load resistance, j is an imaginary operator such that $j^2 = -1$, and $\omega$ is the frequency. The input impedance of the resonant tank network 210 may be the impedance as viewed from the output terminals of the inverter 200.

The magnitude and phase of the input impedance of the resonant tank network 210 may be determined from Equation (1). The impedance, $Z_{in}$ is expressed as a complex expression and may be converted to polar form using standard methods. A complex number having a real term, x, and imaginary term, y, may be converted to polar form having magnitude, P, and an angle, $\theta$. The magnitude, P, may be computed as the square root of the sum of $x^2$ and $y^2$. The angle, $\theta$, may be computed as the arctangent of the quotient of the imaginary term, y, divided by the real term, x. The terms may be manipulated and an expression for the impedance phase angle may be derived.

Equation (1) describes how the parameter values of the transformer model 222 impact the impedance. The parameter values of the transformer model 222 may be known in advance. The parameter values may be calibration values or may be identified via an on-line identification algorithm. The load resistance, $R_e$, may change during charging of the traction battery 24 based on state of charge and temperature of the battery. Further, the load resistance may vary based on additional loads that may be activated during charging such as electrical loads associated with battery heating and cooling. The load resistance may include a resistance of the traction battery 24. The load resistance may vary as a function of temperature and efficiency of the power converter. The magnitude and phase of the input impedance may vary as a function of the load resistance $R_e$ and the coupling coefficient between the coils. The coupling coefficient may be affected by the alignment of the transmit coil 40 and the receive coil 34.

The phase angle of the impedance at the output terminals of the inverter 200 affects the ability to achieve zero voltage switching of the switching devices. The phase angle of the impedance may be measured by monitoring the voltage waveform and the current waveform output from the inverter 200. The IPT controller 220 may be interfaced to a voltage sensor to measure the voltage at the inverter output. The IPT controller 220 may be interfaced to a current sensor to measure the current flowing at the inverter output. As an example, the voltage waveform and the current waveform may be converted to square wave signals that are positive when the waveform is positive and zero when the waveform is negative. The phase angle may be determined based on the time difference between similar transitions of the square wave signals. Other configurations may detect a time difference between zero crossings of the voltage waveform and the current waveform. Additional methods are possible and any method may be acceptable for the disclosed system.

During charging, the parameters of the resonant tank network 210 may be considered to be constant as the magnetic coupling may likely be stationary during this time. Assuming no changes in the relative positioning of the coils, the coupling coefficient between the coils may be a constant value. Under this condition, the gain between the input and output voltages may be unchanged as well. The input impedance phase angle of the resonant tank network 210 determines the applied VA stresses and the efficiency of the inverter 200 coupled to the resonant tank network 210. The input impedance phase angle and the output power may be used as feedback parameters to control the amount of reactive power to cause soft switching (ZVS) of the inverter switching devices while improving resonant network efficiency while delivering the requested output power.

The power converter 224 may be configured to adjust a magnitude of an output voltage. The power converter 224 may regulate the load power while allowing a range of input voltages. The power converter 224 may be a DC/DC converter configured to output a DC voltage that is different than the input DC voltage. In some configurations, the DC/DC converter may be a buck converter. In some configurations, the DC/DC converter may include buck and boost capability. The vehicle power converter 224 may include a switching element 318 that couples a voltage input to the load. The switching element 318 may be a solid-state device such as a MOSFET or may be a relay.

The vehicle may include a converter controller 228 that is configured to control the power conversion functions and interface with the EVSE 38. The converter controller 228 may output control signals to operate the switching element 318 of the power converter 224. The duty cycle of the control signal for the switching element 318 may be adjusted to achieve the desired output voltage of the power converter 224. Depending on the topology of the power converter 224, additional means of controlling the output of the power converter 224 may be available. For example, frequency control and/or phase shift control methods may be available. The control strategy described is applicable to the various power converter configurations.

The IPT system described permits control of certain voltages and currents in the system. The inverter 200 allows control of the voltage that is input to the resonant tank network 210. The magnitude and frequency of the inverter output voltage may be controlled by operating the solid-state switching devices in a prescribed manner. Additionally, the output voltage of the power converter 224 may be controlled by adjusting the duty cycle of the switching element 318 in the power converter 224. The duty cycle may vary between zero and one hundred percent such that a duty cycle of one hundred percent causes the output voltage to be equal the input voltage. The output voltage of the power converter 224 may be the product of the voltage input and the duty cycle. Controlling the inverter 200 and the power converter 224 may allow the power output to the traction battery 24 to be maximized under a variety of conditions.

A frequency controlled IPT system may improve efficiency by adjusting an output voltage set point and output load resistance. These parameters may be controlled to permit operation under a wider range of misalignment conditions and/or variations in system component values. Connecting the IPT system directly to the load introduces a constraint on the output voltage for delivering the desired load power. If the DC/DC power converter 224 is coupled between the IPT system and the load to regulate the load power, the IPT output voltage is no longer constrained by variations in the output load power. This allows a control system to control the IPT output voltage to satisfy other objectives such as soft switching. The voltage set point may control a voltage input to the power converter 224.

The IPT system may be frequency controlled. That is, the inverter 200 may be configured to adjust the frequency of the inverter output voltage. A predetermined range of output voltage frequencies may be defined such that the frequency is maintained within the predetermined range. The frequency range may be defined by industry standards for IPT system (e.g., Society of Automotive Engineers (SAE) standards).

The IPT system may be configured to operate under a predetermined range of coupling coefficients. For example, a predetermined maximum amount of coil misalignment may be tolerated. The coupling coefficient may be identified or estimated.

The charging system may control the inverter output voltage based on an input impedance phase angle and an output power reference. The output power reference may be an amount of power demanded to charge the traction battery 24 and operate accessory loads during charging. The output power reference may be a rated charge power for the EVSE 38. For example, a charging station rated to charge at 3.3 kW may set the output power reference to 3.3 kW to achieve maximum power transfer. In some configurations, the output power reference may be based on other criteria.

The IPT system may be configured to implement a control strategy to determine a voltage reference at the input of the power converter 224. The IPT system may behave such that a profile of the power output as a function of the voltage reference exhibits a peak value. Below a certain voltage reference, the power output may increase as the voltage increases. Above the certain voltage reference, the power output may decrease as the voltage increases. The IPT system may be configured to determine the voltage reference for the peak power output.

The IPT system may implement a variety of optimization strategies. The IPT system may implement a Maximum Power Point Tracking (MPPT) strategy in an effort to transfer a maximum amount of power between the coils. The IPT system may implement a Maximum Efficiency Point Tracking (MEPT) strategy to optimize the efficiency of the energy transfer. The optimization strategy may include a perturb and observe component. For example, the response to changes in the operating point may be monitored to determine if the system response is in a direction that optimizes the objective function. The algorithm may include an incremental conductance strategy in which a rate of change of current with respect to voltage is monitored to determine how the power is changing. Other strategies are possible and may be alternatively selected.

The system may include a main controller 226 that implements an extremum seeking algorithm to minimize an objective function. The main controller 226 may communicate with the IPT controller 220 and the converter controller 228 to deliver commands and receive feedback. The main controller 226 may implement the optimization strategy which may input a demanded power output and a phase angle reference. The demanded power output may be an amount of power requested by the vehicle to charge the traction battery 24 and operate loads during charging. The demanded power output may be rated power output of the charging system. The phase angle reference may be selected to provide ZVS of the switching elements in the inverter 200.

Figure 4:
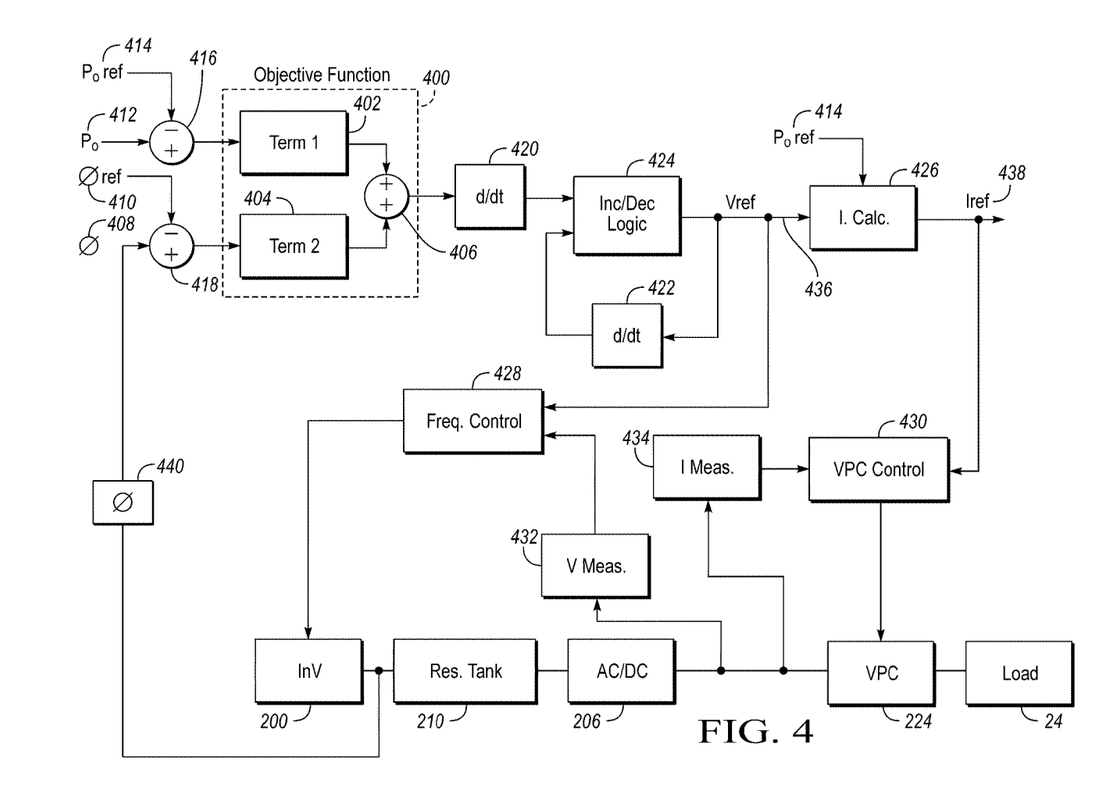
FIG. 4 is a block diagram of possible control system for the vehicle charging system.

A possible control strategy is depicted in FIG. 4. An objective function 400 may be developed to optimize operation of the charging system based on several criteria. The objective function 400 may include a first term 404 based on an error between a measured input impedance phase angle 408 and a reference phase angle 410. A first difference element 418 may output the impedance phase angle error as a difference between the measured input impedance phase angle 408 and the reference phase angle 410. The objective function 400 may be configured to minimize the impedance phase angle error. For example, a first term 404 of the form $W_1/(\phi_{error}+0.1)$ may be defined where $W_1$ is a weighting factor. The term $\phi_{error}$ may be the impedance phase angle error at the output of the inverter 200. The reference phase angle 410 may be a predetermined phase angle. To achieve zero voltage switching, the reference phase angle 410 may be selected to be a positive value indicative of the voltage leading the current. For example, a reference phase angle 410 of twenty degrees may be selected to ensure ZVS of the inverter 200.

The control strategy may include a phase angle determination block 440 that is configured to measure or receive signals indicative of the voltage and current output of the inverter 200. The phase angle determination block 440 may compute and output the input impedance phase angle 408 of the network as described previously.

The objective function 400 may include a second term 402 that is configured to minimize an output power error between a measured power output 412 and a reference power output 414. For example, the second term 402 may be of the form $W_2/(P_{error}+0.1)$, where $W_2$ is a weighting factor. A second difference element 416 may output the output power error as a difference between the measured power output 412 and the reference power output 414. The term $P_{error}$ may be the output power error at the output of the power converter 224. The weighting factors of the objective function 400 may be selected to prioritize power delivery over the input impedance phase control under misalignment conditions or system component variation. The objective function 400 may include a term to limit IPT system operation within a predetermined operating range. A summing element 406 may output the sum of the first weighted term 404 and the second weighted term 402 together to achieve the final objective function value.

The IPT system may be configured to maximize the objective function. In such a system, the relationship of the objective function as a function of the voltage may indicate a peak value. Such a system may be configured to change the voltage in the direction that achieves the peak objective function. For example, the system may be configured to increase a voltage reference when the objective function output and the voltage reference are increasing. This may be determined when the rate of change of the objective function output and the rate of change of the voltage reference are positive. The system may be configured to decrease the voltage reference when the objective function output is decreasing while the voltage reference is increasing. This may be determined when the rate of change of the objective function output is negative and the rate of change of the voltage reference is positive. The system may be configured to drive the voltage reference to achieve the maximum objective function. Similarly, the system may be configured to minimize the objective function which may be achieved by inverting the sign of the weighting factors.

A voltage reference 436 may be determined for the voltage input to the power converter 224. The voltage reference 436 may be based on the weighted objective function 400. In some configurations, the objective function 400 may be differentiated to determine a rate of change of the objective function. A first differentiating element 420 may output a rate of change of the output value of the objective function 400. The differentiating element 420 may output a rate of change of the input based on a difference between input values divided by the time between the input values. A benefit of the disclosed objective function 400 is that the impedance phase angle is controlled to achieve ZVS while still satisfying the reference power output.

The voltage reference 436 may also be differentiated to determine a rate of change of the voltage reference 436. A second differentiating element 422 may output a rate of change of the voltage reference 436.

The rate of change of the objective function 400 and the rate of change of the voltage reference 436 may be input to an increase/decrease logic block 424. The voltage reference 436 may be changed based on the gradient of the voltage reference 436 and the gradient of the weighted objective function 400. Further, the voltage reference 436 may be based on the sign (positive or negative) of the gradients. The voltage reference 436 may be incremented or decremented by a predetermined voltage based on the sign of the objective function gradient and the sign of the voltage reference gradient. For example, when the sign of the objective function gradient and the sign of the voltage reference are the same, the voltage reference may be increased. When both gradients are positive, the behavior is such that increasing the voltage reference 436 increases the value of the objective function 400. Similarly, when both gradients are negative, the behavior is such that decreasing the voltage reference 436 would decrease the objective function 400 so it is preferred to increase the voltage reference. Utilizing a similar analysis, when the signs of the gradients are opposite, the voltage reference 436 may be decreased.

In some configurations, the voltage reference 436 is increased or decreased by a predetermined voltage each time the control strategy is executed. In these configurations, the response of the voltage reference 436 to changes in the system parameters is limited by the predetermined voltage increase and/or decrease.

The resulting system outputs a voltage reference 436 that attempts to optimize the objective function 400. The objective function 400 may be configured to be minimized or maximized. The voltage reference 436 is the desired voltage at the input to the power converter 224. A current reference block 426 may be implemented to compute a current reference 438 based on the power output reference 414 and the voltage reference 436. The current reference 438 may be a desired current input to the power converter 224.

The voltage reference 436 may be input to a frequency control logic block 428. The frequency control logic 428 may use the voltage reference 436 to adjust a frequency of the inverter output voltage. A voltage measurement system 432 may be configured to measure and sample the voltage at the input to the vehicle power converter 224. The voltage measurement system 432 may be implemented as part of a converter controller 228 in the vehicle 12 and may communicate the value to the IPT controller 220. For example, an error between the voltage reference 436 and the voltage input to the power converter 224 may be computed and utilized in a proportional-integral (PI) control strategy to generated a frequency reference for the inverter output. The IPT controller 220 may then adjust the switching of the inverter 200 to the desired frequency. Over time, the voltage input to the power converter 224 should follow the voltage reference 436.

The converter controller 228 may implement a power converter control strategy 430 to control the power converter 224. In some configurations, the power converter control strategy 430 may control a duty cycle of the power converter switching devices. The current reference 438 may be utilized in a control loop along with the actual input current value input to the power converter 224. The converter controller 228 may include a current measurement system 434 that is configured to measure the current input to the power converter 224. For example, an error between the current reference 438 and the measured or estimated current input to the power converter 224 may be computed and utilized in a proportional-integral (PI) control strategy to generate a duty cycle for the power converter 224. The duty cycle may be used to determine a switching pattern for the power converter 224 which changes the voltage output. Note that the PI control strategy is merely exemplary of various control strategies that are available and other control strategies may selected without limitation.

The disclosed control strategy operates by controlling the frequency of the inverter 200 to provide a voltage input to the power converter 224 that produces the desired power output and drives the impedance phase angle toward the predetermined impedance phase angle. The duty cycle of the power converter 224 is controlled to satisfy the desired power output.

The control strategy allows the system to respond to changes in the system parameters or power demand. For example, a change in the load coupled to the power converter 224 may affect the impedance of system. The phase angle of the impedance at the inverter output may be changed such that ZVS of the inverter is affected. The change in load may cause an increase in the power demand of the load. These changes may be reflected in the weighted objective function 400. Based on the rate of change of the objective function 400, the voltage reference 436 may begin to change in a direction to optimize the objective function 400. As the rate of change of the voltage reference 436 may be limited, the voltage reference 436 may begin changing at a predetermined rate.

The current reference 438, being a function of the power demanded 414 and the voltage reference 436, may change quickly in response to the increase in the power demand. The current reference 438 may be provided to the converter controller 228 which may then adjust the duty cycle to achieve the current reference 438. The result may be that the power converter 224 reacts relatively quickly to attempt to satisfy the increase in power demand. For example, an increase in the power demanded may cause an increase in the current reference 438. The increase in the current reference 438 may cause an increase in the duty cycle to increase the voltage output from the power converter 224. The voltage output of the power converter 224 may be limited by the voltage input. That is, the maximum voltage at the power converter output at one hundred percent duty cycle is equal to the voltage input to the power converter. In some cases, an increase in power output may be satisfied by increasing the duty cycle.

In a situation in which the voltage reference increases, the voltage input to the power converter 224 may increase to match the reference. As the voltage reference increases, the current reference may decrease in response. After some time, the voltage reference and the current reference may stabilize at values that optimize the objective function 400. At some time, the objective function 400 may be optimized at the minimum or maximum value. The stable condition for the system may be a state of operation at which the voltage reference oscillates with a small magnitude about the optimum value.

The system disclosed allows for maximizing the power transfer to the traction battery 24 while achieving ZVS. The control is implemented by controlling the inverter 200 and the power converter 224. The addition of the power converter 224 provides an additional degree of control that makes achievement of the two objectives possible. The impedance phase angle and the output power may be used as feedback to control the amount of reactive power to incur soft switching of the inverter switches while delivering the demanded power. In a system that connects the rectified voltage directly to the traction battery 24, a constraint is introduced on the output voltage for delivering the demanded power. The power converter 224 between the rectifier 206 and the traction battery 24 allows an additional degree of control to regulate the output power. The inverter 200 may then be controlled to satisfy other objectives such as soft switching.

The sampling rate of the main controller 226 may be slower than the IPT controller 220 and the converter controller 228. This allows the IPT controller 220 to achieve the voltage reference and the converter controller 228 to achieve the current reference. Other controller configurations are possible. For example, the functions of the main controller 226 may be implemented in the IPT controller 220 or the converter controller 228.

The disclosed strategy allows the IPT system to deliver full power over a wide range of coupling coefficients and variations in system component values. The strategy also improves system efficiency by operating in a region in which soft switching operation of the inverter switching devices is possible. VA stresses in the transmit coil 40 and the receive coil 34 are minimized which may enable designs using lower cost components and improve thermal performance. The strategy further minimizes current circulation in the transmit coil and the receive coil which may minimize electromagnetic field (EMF) exposure and radiated emissions.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle wireless charging system comprising:
   an inverter; and
   at least one controller programmed to change a frequency output of the inverter to control a voltage input to a vehicle power converter to drive an impedance phase angle at an output of the inverter toward a predetermined angle and achieve a power demand at an output of the vehicle power converter according to an error between the voltage input and a voltage reference that is based on the power demand, a power output of the vehicle power converter, the impedance phase angle, and the predetermined angle and change the frequency output based on a rate of change of a weighted objective function configured to reduce an output power error of the vehicle power converter and an impedance phase angle error at an inverter output.

2. The vehicle wireless charging system of claim 1 wherein the predetermined angle is configured to achieve zero voltage switching of the inverter.

3. The vehicle wireless charging system of claim 1 wherein the impedance phase angle is a phase angle difference between a voltage at the output of the inverter and a current at the output of the inverter.

4. The vehicle wireless charging system of claim 1 wherein the voltage reference is based on (i) a rate of change of a weighted sum of a first term using the output power error and a second term using the impedance phase angle error, and (ii) a rate of change of the voltage reference.

5. The vehicle wireless charging system of claim 1 wherein the at least one controller is further programmed to operate the vehicle power converter by adjusting a duty cycle for a switching device for coupling the voltage input to a load based on a current input reference and the current input to the vehicle power converter.

6. The vehicle wireless charging system of claim 5 wherein the current input reference is derived from a voltage reference that is based on (i) a rate of change of a weighted sum of a first term using the output power error and a second term using the impedance phase angle error, and (ii) a rate of change of the voltage reference.

7. A vehicle wireless charging system comprising:
   an inverter configured to inductively couple to a vehicle power converter; and
   at least one controller programmed to control a frequency output of the inverter to adjust a voltage input to the vehicle power converter based on a rate of change of a weighted objective function configured to reduce an output power error of the vehicle power converter and an impedance phase angle error at an inverter output.

8. The vehicle wireless charging system of claim 7 wherein the at least one controller is further programmed to control the frequency output based on a rate of change of the voltage input.

9. The vehicle wireless charging system of claim 7 wherein the at least one controller is further programmed to change a duty cycle for switching the vehicle power converter based on a power demand of a load coupled to the vehicle power converter.

10. The vehicle wireless charging system of claim 7 wherein the output power error is a difference between a power demand at a vehicle power converter output and a power output at the vehicle power converter output, and the impedance phase angle error is a difference between a reference impedance phase angle and a measured impedance phase angle at the inverter output.

11. The vehicle wireless charging system of claim 7 wherein the weighted objective function is such that a first weighting value associated with the output power error is greater than a second weighting value associated with the impedance phase angle error.

12. A method of controlling vehicle charging comprising:
   changing, by at least one controller, a frequency at an output of an inverter that is configured to generate a voltage input to an inductively coupled power converter to drive an impedance phase angle at an output of the inverter toward a predetermined angle and achieve a power demand at an output of the power converter according to an error between the voltage input and a voltage reference that is based on the Dower demand, a power output of the power converter, the impedance phase angle, and the predetermined angle and changing the frequency based on a rate of change of a weighted objective function that includes an output power error of the power converter and an impedance phase angle error at the output of the inverter.

13. The method of claim 12 further comprising changing, by the at least one controller, a duty cycle for switching the power converter based on a current reference for an input current to the power converter derived from the voltage input and a power demand of a load coupled to the power converter.

14. The method of claim 13 further comprising changing, by the at least one controller, the duty cycle to reduce an error between the current reference and a current input to the power converter.

15. The method of claim 12 further comprising changing, by the at least one controller, the frequency to reduce the error between the voltage input and the voltage reference that is further based on the rate of change of the weighted objective function.

16. The method of claim 15 further comprising changing, by the at least one controller, the frequency based on a rate of change of the voltage reference.

17. The method of claim 15 further comprising incrementing, by the at least one controller, the voltage reference by a predetermined amount in response to a sign of the rate of change of the weighted objective function being different than a sign of the rate of change of the voltage reference.

18. The method of claim 15 further comprising decrementing, by the at least one controller, the voltage reference by a predetermined amount in response to a sign of the rate of change of the weighted objective function being identical to a sign of the rate of change of the voltage reference.

* * * * *